(12) United States Patent
Serizawa et al.

(10) Patent No.: US 7,993,475 B2
(45) Date of Patent: Aug. 9, 2011

(54) FIRING AGENT FOR GAS GENERATING DEVICE

(75) Inventors: Kazuya Serizawa, Aichi (JP); Tomonori Tasaki, Aichi (JP); Katsuhiko Takahashi, Aichi (JP)

(73) Assignee: NOF Corporation (JP)

(*) Notice: Subject to any disclaimer, the term of this patent is extended or adjusted under 35 U.S.C. 154(b) by 0 days.

(21) Appl. No.: 12/626,140

(22) Filed: Nov. 25, 2009

(65) Prior Publication Data

US 2010/0109304 A1     May 6, 2010

Related U.S. Application Data (62) Division of application No. 10/571,155, filed as application No. PCT/JP2005/011125 on Jun. 17, 2005, now abandoned.

(30) Foreign Application Priority Data

Jun. 17, 2004    (JP) ................................ 2004-180000
Jun. 17, 2004    (JP) ................................ 2004-180001

(51) Int. Cl.
    *C06B 45/00*     (2006.01)
    *C06B 45/02*     (2006.01)
    *C06B 29/22*     (2006.01)
    *D03D 23/00*     (2006.01)
    *D03D 43/00*     (2006.01)

(52) U.S. Cl. ............. 149/76; 149/2; 149/21; 149/108.6; 149/109.4; 149/109.6

(58) Field of Classification Search .................. 149/76, 149/2, 21, 108.6, 109.4, 109.6
See application file for complete search history.

(56) References Cited

U.S. PATENT DOCUMENTS

| | | | | |
|---|---|---|---|---|
| 2,966,403 A | * | 12/1960 | Weil | 149/19.91 |
| 4,097,241 A | * | 6/1978 | Garner et al. | 102/335 |
| 5,125,684 A | | 6/1992 | Cartwright | |
| 5,147,976 A | * | 9/1992 | Laurensou et al. | 102/275.3 |
| 5,641,938 A | | 6/1997 | Holland et al. | |
| 5,695,216 A | | 12/1997 | Sandstrom et al. | |
| 5,756,929 A | | 5/1998 | Lundstrom et al. | |
| 5,889,161 A | | 3/1999 | Bottaro et al. | |
| 5,898,126 A | | 4/1999 | Yoshida | |
| 5,959,242 A | | 9/1999 | Knowlton et al. | |

(Continued)

FOREIGN PATENT DOCUMENTS

DE     19531288     2/1997

(Continued)

OTHER PUBLICATIONS

Supplementary Europen Search Report, with Respect to PCT/JP2005011125.

(Continued)

*Primary Examiner* — James E McDonough
(74) *Attorney, Agent, or Firm* — Caesar, Rivise, Bernstein, Cohen & Pokotilow, Ltd.

(57) ABSTRACT

A firing agent which is used in a gas generating device of a vehicle occupant protection device together with a non-azide gas generating agent, for firing the non-azide gas generating agent, wherein the firing agent contains a fuel and an oxidizing agent and is configured to burn at a combustion speed higher than that of the non-azide gas generating agent; a method for using the firing agent; and a gas generating device of a vehicle occupant protection device using the firing agent.

3 Claims, 4 Drawing Sheets

U.S. PATENT DOCUMENTS

| | | | |
|---|---|---|---|
| 6,033,500 | A | 3/2000 | Ito et al. |
| 2003/0097953 | A1 | 5/2003 | Seriawa et al. |
| 2003/0145922 | A1 | 8/2003 | Taylor et al. |
| 2003/0150348 | A1 | 8/2003 | Furusawa et al. |
| 2003/0230367 | A1 | 12/2003 | Mendenhall et al. |
| 2004/0108030 | A1 | 6/2004 | Mendenhall et al. |
| 2006/0150855 | A1 * | 7/2006 | Maruyama et al. ...... 102/202.14 |

FOREIGN PATENT DOCUMENTS

| | | |
|---|---|---|
| EP | 0972757 A1 | 1/2000 |
| EP | 1142853 A1 | 10/2001 |
| JP | 9-118580 A | 5/1997 |
| JP | 10-130086 A | 5/1998 |
| JP | 2000-103691 | 4/2000 |
| JP | 2001-002488 | 1/2001 |
| JP | 2002283942 A | 3/2002 |
| JP | 2002-265293 A | 9/2002 |
| JP | 2003182507 A | 3/2003 |
| JP | 2003-112991 A | 4/2003 |
| JP | 2003-527276 A | 9/2003 |
| JP | 2005-219987 A | 8/2005 |
| WO | 9630716 | 10/1996 |
| WO | 9806683 | 2/1998 |
| WO | 99/05079 A1 | 2/1999 |
| WO | 9908983 | 2/1999 |
| WO | 99/57083 A1 | 11/1999 |
| WO | 00/04152 A2 | 1/2000 |
| WO | 00/04152 B1 | 1/2000 |
| WO | 00/46170 A3 | 8/2000 |
| WO | 2004024503 A2 | 3/2004 |

OTHER PUBLICATIONS

International Search Report, PCT/JP2005/011125 (Oct. 4, 2005).

* cited by examiner

FIRING AGENT FOR GAS GENERATING DEVICE

This is a divisional application based on U.S. application Ser. No. 10/571,155 filed Mar. 9, 2006, which is a 371 application of PCT/JP05/11125 filed Jun. 17, 2005, which is a PCT application Japanese Applications 2004-180000 and 2004-180001 filed on Jun. 17, 2004, the entire disclosure of which is incorporated by reference herein.

TECHNICAL FIELD

The present invention relates to a firing agent for use in an occupant protection device in a vehicle, and in particular, to a firing agent which promotes firing of a non-azide gas generating agent.

BACKGROUND ART

Normally, an occupant protection device is mounted in a vehicle in order to protect the occupant from impact shock. Examples of the occupant protection device include an airbag device and a seat belt pretensioner.

An airbag device rapidly inflates a bag by the combustion gas of the gas generating agent when the vehicle crashes at high speed, to prevent the occupant from strongly hit against a hard part inside the vehicle such as a steering wheel, front window shield, and the like. When a vehicle crash occurs at high speed, the seat belt pretensioner instantaneously draws in the seat belt using the combustion gas of a gas generating agent, to prevent the occupant from being thrown out frontward.

The performances required for the gas generating agent for use in occupant protection device include a gasification rate of 70% or greater and a combustion speed of 8.0 mm/seconds or greater (under the nitrogen gas atmosphere pressurized to 7 MPa). High rate of gasification contributes to the reduction of the amount of gas generating agent to be charged into the gas generating device, and downsizing and weight reduction of the occupant protection device. More preferable rate of gasification is 75% or greater.

As a gas generating agent for use in airbag devices and seat belt pretensioners, non-azide gas generating agents containing no sodium azide have been developed. A main component of conventional non-azide gas generating agents is nitrocellulose. Nitrocellulose is preferable in terms of enhancement of the rate of gasification. However, nitrocellulose has a disadvantage that it generates large amount of carbon monoxide when it is combusted, and that it tends to deteriorate at high temperature (low heat resistance).

In recent years, there is a need for a non-azide gas generating agent which satisfies not also the requirements of the gasification rate and the combustion speed, but also the nature which substantially generates no carbon monoxide (carbon monoxide requirement or combustion gas requirement) and the requirement of high heat resistance.

A conventional non-azide gas generating agent for occupant protection device contains an oxidizing agent. Examples of the anti-oxidizing agent include chlorates, perchlorates, nitrates, and nitrites of ammonium, alkali metals and alkali earth metals, which are capable of achieving high gasification rate.

Patent document 1 discloses a non-azide gas generating agent containing ammonium perchlorate as an oxidizing agent and starch as a fuel. Patent document 2 discloses a non-azide gas generating agent containing ammonium nitrate as an oxidizing agent and polyacrylamide as a fuel. Patent document 3 discloses a non-azide gas generating agent containing ammonium nitrate as an oxidizing agent and 5-aminotetrazole as a fuel. These non-azide gas generating agents satisfy the requirement of high gasification rate, the requirement of high heat resistance, and the requirement of combustion gas.

Patent document 1: Japanese Laid-Open Patent Publication No. 2001-2488

Patent document 2: Japanese Laid-Open Patent Publication No. 2000-103691

Patent document 3: Japanese Laid-Open Patent Publication No. 10-130086

A conventional gas generating agent usable in the vehicle occupant protection device has predetermined oxygen balance and the kind of the oxidizing agent, in order to generate combustion gas containing no carbon monoxide and to maintain the gasification rate to be high. However, the ignitability and combustibility of the non-azide gas generating agent decreases as its gasification rate increases. For this reason, although the conventional gas generating agent usable in the vehicle occupant protection device has high gasification rate, its ignitability is very poor and its combustibility is low.

SUMMARY OF THE INVENTION

An object of the present invention is to provide a firing agent for use in a gas generating device together with a non-azide gas generating agent having high gasification rate, capable of quickly firing the non-azide gas generating agent.

An embodiment of the present invention provides a firing agent which is used in a gas generating device of a vehicle occupant protection device together with a non-azide gas generating agent, for firing the non-azide gas generating agent. The non-azide gas generating agent burns as a first combustion speed, and the firing agent contains a fuel and an oxidizing agent, and is configured to burn at a second combustion speed higher than the first combustion speed of the non-azide gas generating agent.

Another embodiment of the present invention provides a method for using a firing agent for firing a non-azide gas generating agent. The non-azide gas generating agent burns at a first combustion speed, and the firing agent contains a fuel and an oxidizing agent and burns at a second combustion speed higher than the first combustion speed. The method includes the step of filling the gas generating device of the vehicle occupant protection device with the non-azide gas generating agent and the firing agent.

Still another embodiment of the present invention provides a gas generating device of vehicle occupant protection device. The gas generating device includes a combustion chamber, an igniting device for supplying thermal energy to the combustion chamber, a non-azide gas generating agent accommodated in the combustion chamber, and a firing agent accommodated in the combustion chamber, for firing the non-azide gas generating agent. The non-azide gas generating agent burns at a first combustion speed, and the firing agent contains a fuel and an oxidizing agent, and burns at a second combustion speed higher than the first combustion speed of the non-azide gas generating agent.

BEST MODE FOR CARRYING OUT THE INVENTION

A firing agent according to a first embodiment of the present invention will now be described. The first embodiment solves the problem associated with the low ignitability and combustibility of the non-azide gas generating agent by adjusting the size of the firing agent.

First, an occupant protection device will now be described referring to FIGS. 3 and 5.

Figure 3A:
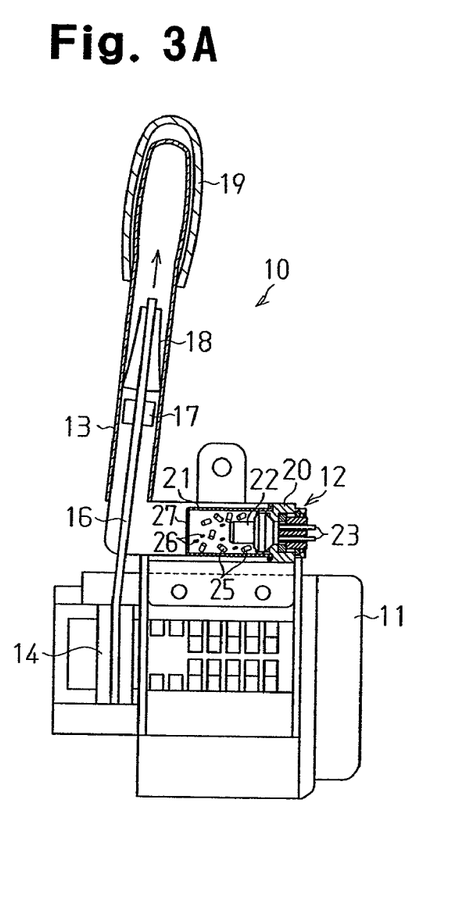
FIG. 3A is a partially broken frontal view of a seat belt pretensioner.
Figure 3B:
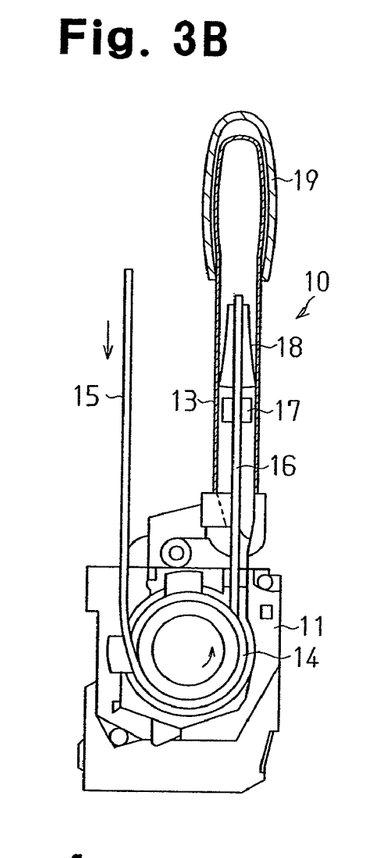
FIG. 3B is a partially broken side view of a seat belt pretensioner.

FIGS. 3A and 3B show a seat belt pretensioner 10 disposed next to a seat in a vehicle compartment. The seat belt pretensioner 10 includes a gas generating device 12 attached to the upper surface of a main body 11. The gas generating device 12 is coupled to an L-shaped cylinder 13. A piston 17 is accommodated in the cylinder 13, and moves upward along the cylinder 13 when the gas generating device 12 generates gas. The piston 17 is fixed to the intermediate portion of a piston rod 16. The upward movement of the piston 17 is restricted by a stopper 18 fixed inside the cylinder 13. A cap 19 covers the upper end portion of the cylinder 13. A rotating drum 14 is rotatably supported by the main body 11. One end of a seat belt 15 is wound around the rotating drum 14. A lower end of the piston rod 16 is connected to the rotating drum 14.

Figure 2:
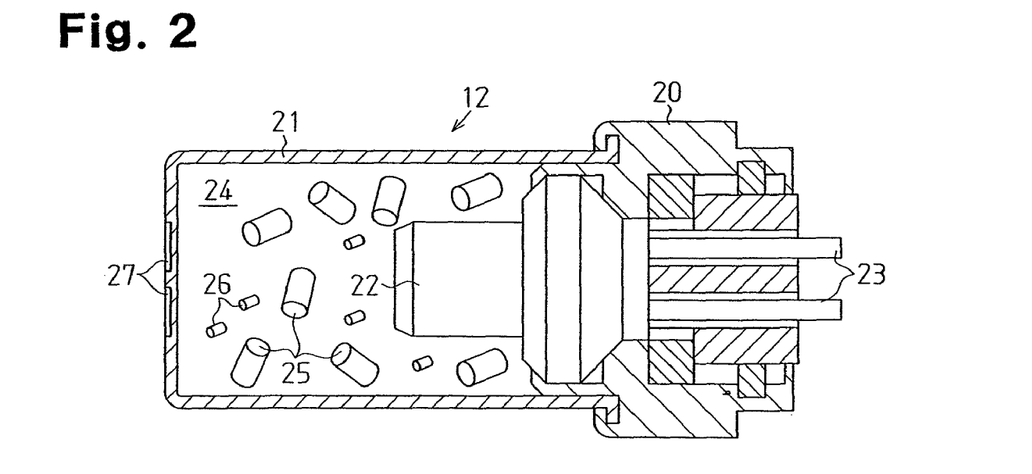
FIG. 2 is a schematic cross-sectional view of a gas generating device.

A gas generating device 12 will now be described referring to FIG. 2.

The gas generating device 12 includes: a main body 20, a cylindrical container 21 attached to the main body 20 to define a combustion chamber 24, an electric igniter supported by the main body 20 to supply ignition energy to the combustion chamber 24, and a lead wire 23 electrically connected to the electric igniter 22. A non-azide gas generating agent 25 and a firing agent 26 having a smaller size than the as generating agent 25 are charged in the combustion chamber 24. Radially extending grooves 27 are formed on one surface of the container 21. The gas generating agent 25 and the firing agent 26 which are columnar in shape are shown in FIG. 2.

When the electric igniter 22 is energized to start its operation, the electric igniter 22 generates thermal energy. By this thermal energy, the firing agent 26 and the gas generating agent 25 are ignited in the combustion chamber 24 and burn to generate gas. By the pressure of the gas, the container 21 brakes at the relatively weak portions of the grooves 27 to create gas release holes. The gas is released from the container 21 through the gas release holes to the inside of the cylinder 13. The gas moves the piston 17 to rotate the rotating drum 14. As a result, the seat belt 15 is drawn in.

Figure 5:
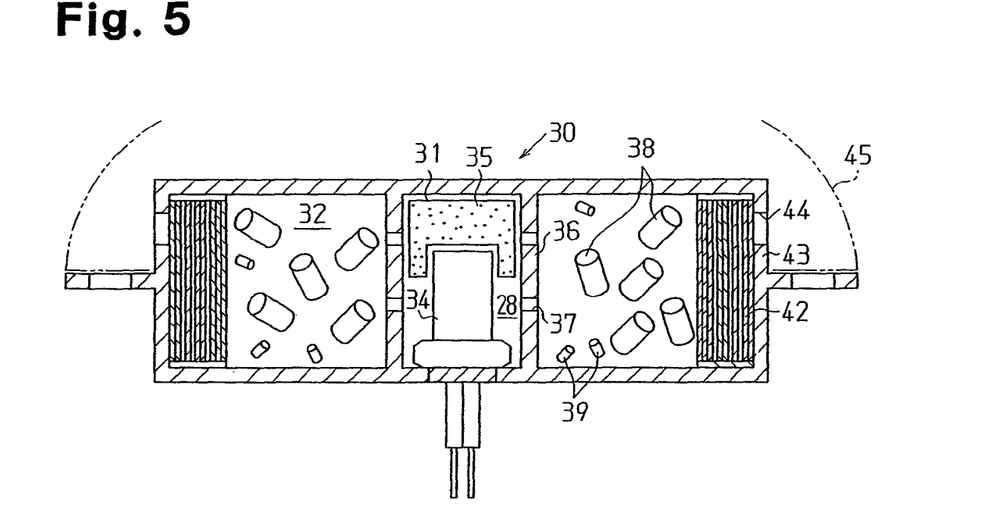
FIG. 5 is a cross-sectional view of a gas generating device.

FIG. 5 shows an airbag device including an airbag 45 and a gas generating device 30. The gas generating device 30 includes a cylindrical housing. The housing partitions an ignition chamber 28 which accommodates an ignition unit 31 and a donut-shaped combustion chamber 32 which accommodates a non-azide gas generating agent 38 from each other. A firing agent 39 is accommodated in the combustion chamber 32. Alternatively, a part or the entire of the firing agent 39 may be accommodated in the ignition chamber 28. The firing agent 39 is smaller in size than the gas generating agent 38. The gas generating agent 38 and the firing agent 38 which are columnar are shown in FIG. 5.

A partitioning wall 36 is disposed between the combustion chamber 32 and the ignition chamber 28. The partitioning wall 36 has a plurality of ventilating holes 37. The ignition unit 31 includes an electric igniter 34, and an igniting charge 35 positioned on the electric igniter 34.

When the electric igniter 34 is energized to start its operation, the electric igniter 34 ignites the igniting charge 35. The flame (i.e. the thermal energy) of the igniting charge 35 passes through the ventilating holes of the partitioning wall 36 to reach the combustion chamber 32. By this thermal energy, the gas generating agent 38 and the firing agent 39 are fired in the combustion chamber 32 and burn to generate gas.

The gas generating device 30 includes a filter 42 disposed along a peripheral wall 43 in the combustion chamber 32. The filter 42 has a function of cooling the combustion gas and a function of filtering and capturing combustion residues (solids). The peripheral wall 43 of the combustion chamber 32 is formed with a plurality of gas release holes 44. The gas, after cooled by the filter 42, is supplied to the airbag 45 through the gas release holes 44 to inflate the airbag 45.

The non-azide gas generating agents 25, 38 generates combustion gas. The pressure of the gas is utilized as a driving force for inflating the airbag 45 and moving the piston 17 (fastening the seat belt). Since a large amount of the non-azide gas generating agents 25, 38 are charged into the gas generating devices 12, 30, the non-azide gas generating agents are required to generate combustion gas which substantially contains no harmful components such as carbon monoxide, nitrogen oxide, hydrogen chloride and the like. This is because the harmful components are possible to exert adverse influence to the occupant in the vehicle compartment. The compositions of the non-azide gas generating agents 25, 38 are determined in such a manner that they never generate gases containing harmful components and that they have high gasification rates. Depending on the application, that is, depending on the operating time required for the gas generating devices 12, 30, the combustion speed required for the non-azide gas generating agents 25, 38 are determined. Therefore, the non-azide gas generating agents 25, 38 which satisfy the combustion gas requirement, the gasification rate requirement, and the combustion speed requirement are charged into the gas generating devices 12, 30.

The firing agents 26, 39 are ignited to burn more quickly than the non-azide gas generating agents 25, 38, and thus have functions of quickly firing the non-azide gas generating agents 25, 38 having poor ignitability and combustibility. The firing agents 26, 39 each are also referred to as an ignition and combustion promoting agent or as an ignition and combustion assisting agent. The firing agents 26, 39 must have ignitability and combustibility superior to those of the non-azide gas generating agents. Since the firing agents 26, 39 are used in amounts smaller than the non-azide gas generating agents, there is no need of taking into consideration their gasification rate and combustion gas components.

The combustion speed can be expressed as an elapsed time (reached time) from the point when the energization to the igniter 22, 34 is started to the point when the gas pressures inside the combustion chambers 24, 32 have reached the maximum value. In the first embodiment, the combustion speeds of the firing agents 26, 39 are adjusted to be shorter than the combustion speeds of the non-azide gas generating agents 25, 38. Alternatively, firing agents 26, 39 having combustion speeds higher than the combustion speeds of the non-azide gas generating agents 25, 38 are used.

Non-azide gas generating agents having high gasification rates are hard to be ignited (low ignitability). In combination with the firing agents 26, 39 having excellent ignitability and combustibility, the non-azide gas generating agents are quickly ignited. Specifically, the firing agents 26, 39 are instantaneously ignited by the thermal energy generated by the igniter. By the flame created by the combustion of the firing agents, the non-azide gas generating agents are instantaneously ignited and burn. In this manner, in combination with the firing agents, the low ignitability and combustibility of the non-azide gas generating agents are compensated, thereby increasing the ignitability and combustibility of the whole chemical agents charged into the gas generating device.

The firing agents 26, 39 preferably are molded bodies having predetermined shapes. Alternatively, the igniter agents 26, 39 may be grains or powders having rough surfaces, or may have distorted indefinite shapes.

The firing agents 26, 39 are employed in the occupant protection device, and are required to be accommodated inside the gas generating devices which are filled with the gas generating agents 25, 38. For this reason, the shapes of the firing agents 26, 39 are restricted by the dimensions of the gas generating devices into which the firing agents 26, 39 are to be charged. For example, for use in the seat belt pretensioner 10, the maximum outer diameters of the firing agents 26, 39 are restricted to 8 mm or smaller. Preferable maximum length is 15 mm or shorter.

The combustion speeds of the firing agents 26, 39 or the gas generating agents are measured by the closed bomb test. The combustion test is defined by the time elapsed from the point when the energization to the igniters 22, 34 is started to the point when the gas pressure inside the combustion container has reached the maximum value (reached time), in the state where the closed container is filled with the firing agent or gas generating agent at a filling density of 0.059 g/ml. A specific example of the measurement of the combustion speed will now be described later.

Preferable reaching time of the firing agent is 5 to 20 ms, and preferable reaching time of the non-azide gas generating agent is 25 to 100 ms. More preferable reacting time of the non-azide gas generating agent is 30 to 65 ms.

If the reaching time of the firing agents 26, 39 is less than 5 ms, the gas generating speed becomes too high. In this case, there may be a possibility that the firing agents 26, 39 instantaneously burn out and the non-azide gas generating agents cannot be ignited. If the reaching time of the firing agents 26, 39 exceed 20 ms, the gas generating speed becomes too low, and it is difficult to obtain the action of quickly igniting the gas generating agents 25, 38. If the reaching time of the non-azide gas generating agents is less than 25 ms, the gas generating speed tends to be too high. On the other hand, if the reaching time of the non-azide gas generating agents exceeds 100 ms, the gas generating speed becomes too low. Such agents are hard to be employed in the gas generating devices 12, 30.

The shapes of the firing agents 26, 39 will now be described. The combustion of the firing agents 26, 39 and the non-azide gas generating agents starts at their surfaces, and proceeds toward plural directions. In this specification, the plural directions are referred to as combustion directions. The firing agents have plural dimensions along plural combustion directions. In this specification, the minimum value among the plural dimensions is referred to as the minimum dimension L.

Preferable firing agents 26, 39 are grains each having a minimum dimension L of approximately 0.1 to 3 mm, or powders having a minimum dimension L of approximately 0.01 to 1 mm. The minimum dimensions L of the firing agents are determined to be smaller than the minimum dimensions L of the non-azide gas generating agents. The firing agents 26, 39 in such a dimensional relationship quickly ignite the non-azide gas generating agents, thereby compensating for the low ignitability and combustibility of the non-azide gas generating agents. The minimum dimensions L of the firing agents 26, 39 are 0.01 to 3 mm. It is preferable that the minimum dimensions L of the non-azide gas generating agents fall within the range of 0.3 to 4 mm and the minimum dimensions L of the firing agents 26, 39 are smaller than the minimum dimensions L of the non-azide gas generating agents.

Figure 1A:
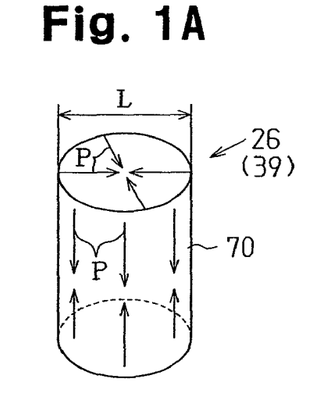
FIGS. 1A to 1G are perspective views of the firing agent according to a first embodiment of the present invention.
Figure 1B:
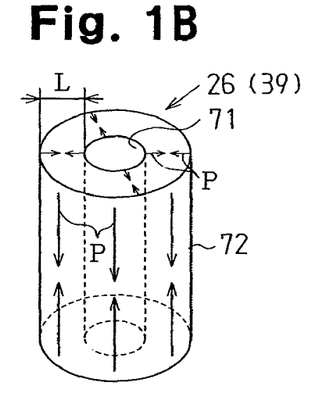
Figure 1C:
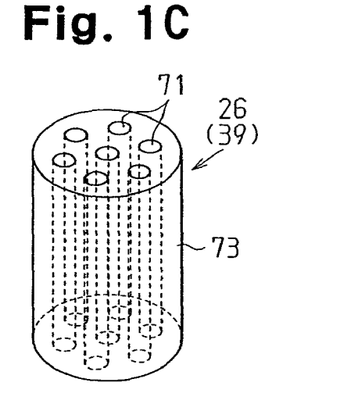
Figure 1D:
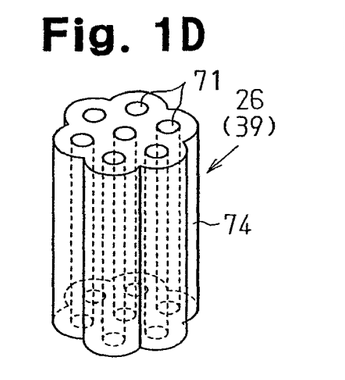
Figure 1E:
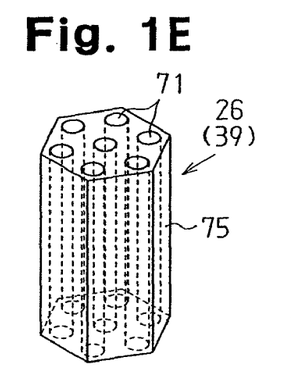
Figure 1F:
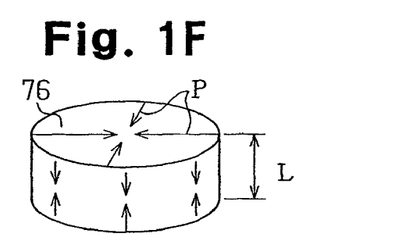
Figure 1G:
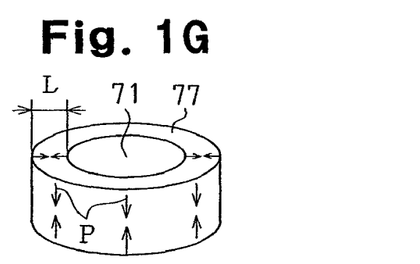

The firing agents 26, 39 are not limited to specific shapes as far as they satisfy the aforementioned conditions, and may assume any shapes as far as they exhibit excellent ignitability. An example of the molded bodies of the firing agents 26, 39 is a hollow body including a solid body having an axial line and a hole extending along the axial line. Specific examples thereof are a column 70 as shown in FIG. 1A, a cylinder 72 having a through hole 71 extending along the axial line as shown in FIG. 1B, a column 73 having seven through holes 7 as shown in FIG. 1C, a irregular column 73 having seven through holes 71 as shown in FIG. 1D, a hexagonal column 75 having seven through holes 71 as shown in FIG. 1E, a disc (short-height column) 76 as shown in FIG. 1F, and a ring (short-height cylinder) 77 having a through hole 71 as shown in FIG. 1G.

The combustion directions of the firing agents 26, 39 will now be described. In the case of solid bodies 70, 76 shown in FIGS. 1A and 1F, the combustion directions P are downward and upward directions respectively from the upper end and the lower end along the axial line, and the radially inward direction from the external peripheral surface toward the axial line (center). In the case of the hollow bodies 72, 77 shown in FIGS. 1B and 1G, the combustion directions P are downward and upward directions respectively from the upper end and the lower end along the axial line, the radially inward direction from the outer peripheral surface toward the inner peripheral surface, and the radially outward direction from the inner peripheral surface toward the outer peripheral surface. In the case of the hollow bodies shown in FIGS. 1C, 1D, 1E, the combustion directions P (not shown) are downward and upward directions respectively from the upper and the lower end along the axial line, the radially inward direction from the outer peripheral surface toward the axial line (center), and the outward direction from the inner peripheral surface of each hole.

The firing agents 26, 39 individually have a through hole 71 located at the center position and six through holes 71 located outer position from the center through hole 71. The outer six through holes 71 are located around the center through hole 71 at intervals with equal angles with respect to the center through hole 71. Three through holes 71 adjacent to each other together constitute a regular triangle. In other words, the distances between adjacent three holes 71 (thicknesses of the walls) are equal to each other.

In order to use the firing agents 26, 39 for the gas generating device of the occupant protection device, it is required to adjust the above-described reaching time to 5 to 20 ms and to suppress the variations in the igniting performances to be as low as possible. From this point of view, the minimum dimensions L of the firing agents 26, 39 are 0.01 to 3 mm, and the shapes and dimensions of the firing agents 26, 39 are uniform as much as possible. If the minimum dimension L is less than 0.01 mm or the minimum dimension L exceeds 3 mm, there is a fear that the aforementioned reaching time falls out of the range of 5 to 20 ms.

The aforementioned minimum dimension will now be described. In the case of the column 70 shown in FIG. 1A, the minimum dimension L is a diameter of the column. In the case of the cylinder 72 shown in FIG. 1B, the minimum dimension L is a distance between the outer peripheral surface and the inner peripheral surface of the cylinder 72, that is, the thickness of the peripheral wall. In the case of the disc 76 shown in FIG. 1F, the minimum dimension L is a length along the axial line, that is, the thickness of the disk 76. In the case of the ring 77 shown in FIG. 1G, the minimum dimension L is a distance between the outer peripheral surface and the inner peripheral surface, that is, the thickness of the peripheral wall. Since the combustion proceeds in the plural directions P, the minimum dimension L is a minimum value among the dimensions along the combustion directions P.

By determining the minimum dimension L in such a manner that the above-described conditions are satisfied, the above-described reaching time can be achieved. On the other hand, in the case of the firing agents 26, 39 having the shapes shown in FIGS. 1A and 1B, the length along the axial line (height) is the maximum dimension. However, the contribution of the maximum dimension to the reduction in the aforementioned reaching time is small.

In the case where the firing agents 26, 39 are in the shape of column (FIG. 1A), it is preferable that the outer diameter is 0.1 to 2 mm and the length along the axial line is 0.1 to 3 mm. In order to ignite the non-azide gas generating agents more quickly, more preferable outer diameter is 0.1 to 1 mm, and more preferable length is 0.5 to 2 mm. In consideration of the mechanical feature and the chargeability into the gas generating device of the firing agents 26, 39, especially preferable outer diameter is 0.2 to 0.8 mm and especially preferable length is 1 to 2 mm. If the outer diameter or the length is less than 0.1 mm, molding of the firing agents 26, 39 tends to be difficult. If the outer diameter exceeds 2 mm or the length exceeds 3 mm, there arises a case where the necessary amount of firing agents 26, 39 cannot be charged in the gas generating devices.

If the firing agents 26, 39 are hollow bodies each having a hole extending in the axial line (FIGS. 1B to 1E), it is preferable that the outer diameter is 0.3 to 3 mm, the hole diameter is 0.1 to 1 mm, the length is 0.1 to 3 mm, and the wall thickness is 0.1 to 1.5 mm. If it is required to ignite the non-azide gas generating agents more quickly, it is more preferable that the outer diameter is 0.3 to 2 mm, the hole diameter is 0.1 to 0.8 mm, the length is 0.5 to 2 mm, and the thickness is 0.1 to 1 mm. In consideration of the mechanical feature and the chargeability into the gas generating device of the firing agents 26, 39, it is especially preferable that the outer diameter is 0.5 to 1.6 mm, the hole diameter is 0.1 to 0.5 mm, the length is 1 to 2 mm, and thickness is 0.2 to 0.8 mm. The hole diameter described above is an inner diameter of each hole.

If the thickness or the length is less than 0.1 mm, molding tends to be difficult. If the outer diameter exceeds 3 mm or the length exceeds 3 mm, there arises a case where the necessary amount of firing agents 26, 39 cannot be charged in the gas generating devices. If the thickness exceeds 1.5 mm, the combustion time of the firing agents 26, 39 becomes long, and there arises a case where the ignition of the gas generating agents is delayed.

In the case where the firing agents 26, 39 are in the form of powder, it is preferable that the minimum dimension L is 0.01 to 1 mm. In order to quickly ignite the non-azide gas generating agents, it is more preferable that the minimum dimension L is 0.01 to 0.5 mm. In consideration of the mechanical feature and the chargeability into the gas generating device of the firing agents 26, 39, it is especially preferable that the minimum dimension L is 0.02 to 0.1 mm.

The shape of the non-azide gas generating agents to be used together with the firing agents 26, 39 will now be described. The non-azide gas generating agents are not limited to specific forms. In general, they are in the form of grains or powder, or may be in the same form employed for the firing agents 26, 39. Specifically, a hollow body (cylinder, column having a hole, ring) having a solid body (columnar body, disc) having an axial line, and a hole extending along the axial line. The shapes of the non-azide gas generating agents are properly determined, in consideration of the combustion speed requirement required for the gas generating agents and the easiness of charging into the gas generating devices.

If the non-azide gas generating agents are in the shape of column, it is preferable that the outer diameter is 0.3 to 3 mm and the length is 0.3 to 4 mm. In consideration of the chargeability into the gas generating device and productivity, it is more preferable that the outer diameter is 0.5 to 2.5 mm and the length is 0.8 to 3 mm, and it is especially preferable that the outer diameter is 0.8 to 2 mm and the length is 1.3 to 2.5 mm. If the outer diameter or the length is less than 0.3 mm, there is a fear that the necessary amounts cannot be charged in the gas generating devices and the productivity tends to be poor. If the non-azide gas generating agents have an outer diameter exceeding 3 mm or the length exceeding 4 mm, the bulk density lowers and there is a fear that the necessary amounts cannot be charged in the gas generating devices.

If the non-azide gas generating agents are in the form of hollow bodies each having a hole extending along the axial line, it is preferable that the outer diameter is 0.5 to 3.5 mm, the hole diameter is 0.1 to 1.5 mm, the length is 0.5 to 3.5 mm, and the wall thickness is 0.2 to 2 mm. In consideration of the chargeability into the gas generating device and productivity, it is more preferable that the outer diameter is 1 to 2.5 mm, the hole diameter is 0.1 to 1.3 mm, the length is 1 to 3 mm, and the wall thickness is 0.3 to 1.5 mm, and it is especially preferable that the outer diameter is 1.3 to 2 mm, the hole diameter is 0.1 to 1 mm, the length is 1.5 to 2.5 mm, and the thickness is 0.5 to 1.3 mm.

If the thickness is less than 0.2 mm, there is a possibility that the required amounts cannot be charged into the gas generating devices. There is a fear that the combustion time shortens and the performance as the non-azide gas generating agents cannot be sufficiently exhibited. If the outer diameter of the length exceeds 3.5 mm, there is a fear that the bulk density lowers and the required amounts of the non-azide gas generating agents cannot be charged into the gas generating devices.

A method for producing the firing agents 26, 39 will now be described.

When an extrusion molding is employed for molding the firing agents 26, 39 in the form of grains, an oxidizing agent, a polymer binder, and a fuel are weighed. If necessary, additives such as a plasticizer, an aging stabilizer, a slug forming agent and the like are weighed. The weighed components, water or an organic solvent are blended by a kneader to prepare a uniform bulk body.

As an organic solvent to be used for the extrusion molding, any one of the known organic solvents to be used in dissolving or swelling a polymer binder may be employed. For example, an organic solvent such as acetone, ethyl alcohol, ethyl acetate and the like may be used. The mixed solution thereof may also be used. In this case, it is preferable that the blending ratio in the mixed solution of the acetone and ethyl alcohol is acetone/ethyl alcohol=90/10 to 20/80 at a mass ratio. In consideration of the moldability of the firing agents 26, 39, it is especially preferable that acetone/ethyl alcohol is 80/20 to 40/60 at a mass ratio. This is because, if acetone is used alone, it evaporates too quickly and it becomes difficult to produce the firing agents 26, 39, and contrarily, if ethyl alcohol is used alone, it becomes difficult to completely dissolve or swell the binder. Then, the uniformly mixed bulk body is charged into the extruder, and is extruded through the holes of die under the application of a predetermined pressure into predetermined shapes. After that, the resultants are cut into predetermined lengths and dried, to create molded bodies.

When pelletization is employed for molding the firing agents 26, 39 in the form of grains, an oxidizing agent and a fuel are weighed. If necessary, additives such as a plasticizer, an aging stabilizer, a slug forming agent and the like are weighed. The weighed components, water or an organic solvent are blended by a kneader to prepare a uniform bulk body. As an organic solvent to be used for the pelletization, any one of the known organic solvents that enhance the mixing property and processability of the raw material components may be employed. Examples thereof include acetone and ethyl alcohol.

The mixed solution of water and these organic solvents may also be used. In this case, it is preferable that the blending ratio in the mixed solution of water and acetone is water/acetone=10/90 to 70/30 at a mass ratio. In consideration of the mixing property, processability, and moldability of the firing agents 26, 39, it is especially preferable that water/acetone is 10/90 to 50/50 at a mass ratio. This is because, if acetone is used alone, it evaporates too quickly and it becomes difficult to produce the firing agents 26, 39. If water is used alone, long time is required for drying the granulated products, and this is not preferable. However, water may be used alone.

Then, the uniformly mixed bulk body is charged into the granulator, and is extruded through the holes of the punching metals under the application of a predetermined pressure into predetermined shapes. After that, the resultants are dried, to create molded bodies. If the firing agents 26, 39 in the form of granules contain a large amount of organic solvent such as acetone, ethyl alcohol, ethyl acetate and the like, deterioration in the combustion performance is observed. Therefore, it is preferable that the organic solvent is removed as much as possible. When the drying process is completed, it is preferable that the organic solvent component is normally at 0.5 mass % and water is at 1.0 mass % or lower. In order to facilitate the handling after the molding process, it is more preferable that the organic solvent component is at 0.3 mass % or lower and water is at 0.5 mass % or lower. When the drying process is completed, it is especially preferable that the organic solvent component is at 0.1 mass % or lower and water is at 0.2 mass % or lower. If the organic solvent component exceeds 0.5 mass % or water exceeds 1.0 mass %, the gas generation speed or the mechanical property of the firing agents 26, 39 tend to be low.

The blending ratio between the firing agents 26, 39 and the non-azide gas generating agents will now be described. A preferable blending ratio is 60 to 98 mass % of the non-azide gas generating agents and 20 to 40 mass % of the firing agents 26, 39.

The seat belt pretensioner 10 requires gas generation speed higher than that of the agents used for the airbag devices, and combustion profile in which combustion linearly proceeds from the point when the energization to the igniter is started to the point when the maximum pressure is reached. For this reason, when the agents are used for the seat belt pretensioner 10, in order to more quickly ignite the non-azide gas generating agents, it is more preferable that the non-azide gas generating agents are 60 to 95 mass % and the firing agents 26, 39 are 5 to 40 mass %. In consideration of the gasification rate and the chargeability into the gas generating devices, it is especially preferable that the non-azide gas generating agents are 80 to 95 mass % and the firing agents 26, 39 are 5 to 20.

When the agents are used for the airbag 45, it is more preferable that the non-azide gas generating agents are 60 to 85 mass %, and the firing agents 26, 39 are 15 to 40 mass %. It is especially preferable that the non-azide gas generating agents are 70 to 85 mass %, and the firing agents 26, 39 are 15 to 30 mass %.

If the ratio of the firing agents 26, 39 is less than 2 mass %, the ignitability is not sufficiently exhibited and it becomes difficult to quickly ignite the non-azide gas generating agents. On the other hand, if the ratio of the firing agents 26m, 39 exceeds 40 mass %, the gas generating speed becomes too high, and it is likely that the required value cannot be satisfied or the gasification rate may be lowered.

When the firing agents 26, 39 and the non-azide gas generating agents are used together, it is required without fail that the combustion speed of the firing agents 26, 39 is always higher than the combustion speed of the non-azide gas generating agents. This is because, if the firing agents 26, 39 having combustion speed lower than that of the non-azide gas generating agents are used, the non-azide gas generating agents cannot be quickly ignited.

The shapes of the firing agents 26, 39 may be identical to or difficult from the shapes of non-azide gas generating agents, as far as the combustion speed of the firing agents 26, 39 is higher than the combustion speed of the non-azide gas generating agents. When the firing agents 26, 39 and the non-azide gas generating agents identical in shapes are used together, the combustion speed of the firing agents 26, 39 is adjusted to be higher than the combustion speed of the non-azide gas generating agents, by using different raw materials between the firing agents 26, 39 and the non-azide gas generating agents, or by adjusting the blending ratio between the oxidizing agent and the fuel in the firing agents 26, 39.

The firing agents 26, 39 are charged into the gas generating devices together with the non-azide gas generating agents. For example, the firing agents 26, 39 and the non-azide gas generating agents may be located in a mixed state in one and the same chamber. Alternatively, the firing agents 26, 39 are located in the vicinity of the igniter, whereas the gas generating agents 25, 38 may be located at a position far from the igniter. The non-azide gas generating agents which is the most preferable for use together with the firing agents 26, 39 are those containing an ammonium oxysalt oxidizing agent. This is because the non-azide gas generating agent of this type has extremely high gasification rate, due to its low ignitability and combustibility, the use of the non-azide gas generating agent alone cannot satisfy the combustion performance requirement required by the occupant protection device.

The composition of the firing agents 26, 39 will now be described. The firing agents 26, 39 contain an oxidizing agent and a fuel. The firing agents 26, 39 may further contain additives such as a plasticizer, an aging stabilizer, and a slag forming agent. The oxidizing agent to be used for the firing agents 26, 39 is not specifically limited, and any known oxidizing agent may be used.

Figure 4:
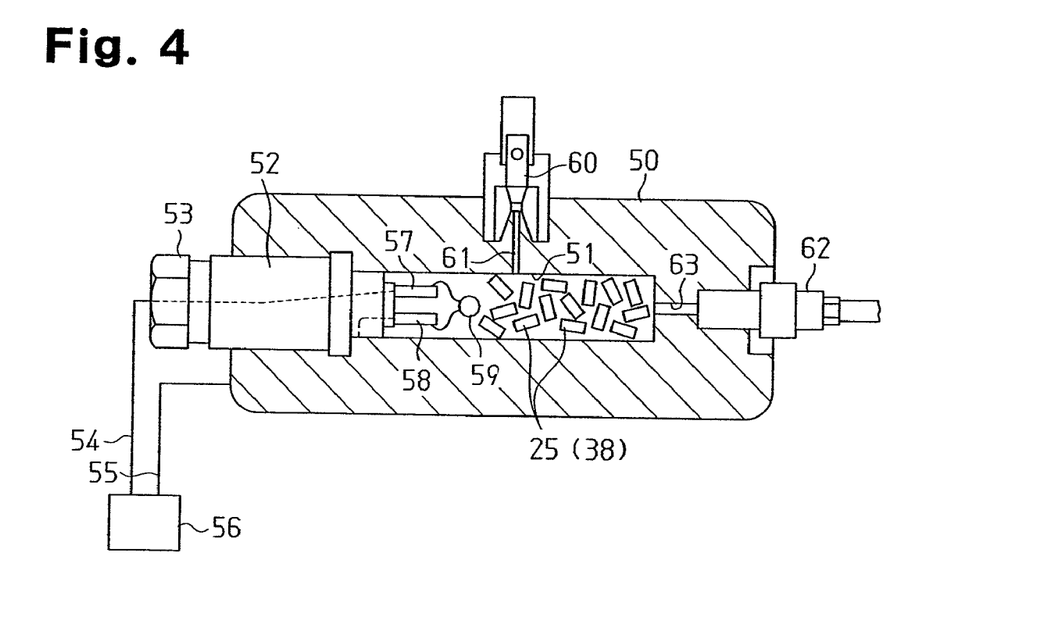
FIG. 4 is a cross-sectional view of a closed bomb testing device.

The aforementioned closed bomb test was conducted by the following method using a closed bomb testing device.

A closed bomb testing device will now be described. As shown in FIG. 4, a bomb main body 50 includes a combustion chamber (cylinder) 51 having a volume of 70 ml. The combustion chamber 51 is filled with the gas generating agents 25, 38 or the firing agents 26, 39. The volume of the combustion chamber 51 was calculated by subtracting a partial volume of a plug 52 from the volume of a circular column body having a diameter of 35 mm and a depth of 75 mm. At one end of the bomb main body 50, a plug 52 for charging or enclosing the gas generating agents 25, 38 or the firing agents 26, 39 into the combustion chamber 51. The plug 52 is detachable by a bolt 53. Similarly, to the same one end of the bomb main body 50, an igniting device 56 is connected via a lead wire 54, and a lead wire 55 is connected to the bomb main body 50.

At an inner end surface of the plug 52 in the combustion chamber 51, a pair of electrodes 57, 58 is attached. The electrode 57 is connected to the lead wire 54, and the electrode 58 is connected to the bomb main body 50. To both of the electrodes 57, 58, a fuse head (having 0.5 g of boron saltpeter) 59 is attached via connection wires. In response to the action of the igniting device 56, the fuse head 59 is ignited, and the gas generating agents 25, 38 or the firing agents 26, 39 are ignited and burn.

At the side surface of the bomb main body, a venting valve 60 is attached and is communicated with the combustion chamber 51 via a sampling tube 61. Gas inside the combustion chamber 51 can be sampled from the venting valve 60. The combustion feature can be evaluated based on the composition of the gas. A pressure sensor 62 is communicated with the combustion chamber 51 via the communicating tube 63. The pressure sensor 62 detects the pressure of the combustion chamber 51, and outputs a detection signal. By monitoring the detection signal, the operation time (reaching time) from the point when the igniting device 56 starts to operate to the point when the pressure of the combustion chamber 51 reaches the maximum value can be obtained.

The gas generating agents 25, 38 or the firing agents 26, 39 are charged into the combustion chamber 51 with the plug 52 detached. As this time, the amount to be charged was set to meet the charging density of 0.059 g/ml. Then, the plug 52 was closed, and the gas generating agents 25, 38 or the firing agents 26, 39 in the combustion chamber 51 are ignited by the igniting device 56. Then, the relationship between the combustion time and the combustion pressure at the time of combustion was measured by an oscilloscope (not shown) via the pressure sensor 62, to obtain the reaching time from the point when the energization to the igniter was started to the point when the maximum pressure was reached. The reaching time required for the gas generating agent for use in the airbag device, from the point when the energization to the igniter is started to the point when the maximum pressure is reached is normally 50 to 65 milliseconds. The reaching time required for the gas generating agent for use in the seat belt pretensioner, from the point when the energization to the igniter is started to the point when the maximum pressure is reached is normally 15 to 30 milliseconds.

In the gas generating device 12, based on the signal generated when the vehicle has crashed or the like, the electric igniter 22 is energized to ignite the firing agent 26 in the combustion chamber 24. Simultaneously, the non-azide gas generating agent 25 is burned to generate combustion gas containing nitrogen gas. At this time, since the minimum dimension L of the firing agent 26 is smaller than the minimum dimension L of the gas generating agent 25, the firing agent 26 is ignited through the energization to the electric igniter 22. Simultaneous to this, the gas generating agent 25 quickly burns by the flame of the firing agent. Since the firing agent 26 is located in the combustion chamber 24 in a state of being mixed with the gas generating agent 25, the combustion of the gas generating agent 25 based on the ignition of the firing agent 26 uniformly proceeds over the combustion chamber 24 entirely.

The combustion gas generated in the combustion chamber 24 breaks the portions formed with the grooves 27 to erupt into the cylinder 13, and allows the piston 17 to move together with a piston rod 16. The movement of the piston rod 16 rotates the rotating drum 14 to draw in the seat belt 15.

In the gas generating device 30, based on the signal generated when the vehicle has crashed or the like, the igniting charge 35 is ignited by the energization to the electric igniter 34. The frame created by the ignition propagates to the combustion chamber 32 via the ventilation hole 37 to ignite the firing agent 39 in the combustion chamber 32, and the non-azide gas generating agent 38 burns to generate combustion gas. At this time, since the minimum dimension L of the firing agent 39 is smaller than the minimum dimension L of the gas generating agent 38, the firing agent 39 is ignited through the energization to the electric igniter 22, and the gas generating agent 38 quickly burns by the frame of the firing agent. Thus-generated combustion gas erupts from the gas release holes 44 via a filter 42 to inflate the airbag 45.

According to the first embodiment, the following advantages can be obtained.

In the first embodiment, the minimum dimension L of the Firing agents 26, 39 is smaller than the minimum dimension L of the non-azide, gas generating agents 25, 38. Due to this configuration, the firing agents 26, 39 are ignited earlier than the gas generating agents 25, 38, and can ignite the gas generating agents 25, 38 quickly. Thus, the non-azide gas generating agents 25, 38 burn at a combustion profile required for the gas generating device for use in the occupant protection device. Therefore, it is possible to provide a gas generating device for use in an occupant protection device which satisfies the gasification rate requirement and the combustibility requirement.

Firing agents according to a second embodiment of the present invention will now be described. The second embodiment solves the problem associated with the low ignitability and combustibility of the non-azide gas generating agent by the composition of the firing agent.

The firing agents 26, 39 respectively contain an oxidizing agent and a fuel. The firing agents 26, 39 may further additives such as a plasticizer, an aging stabilizer, a slug forming agent and the like. Examples of the oxidizing agent to be used in the firing agents 26, 39 include nitrate, nitrite salt, and halide.

Nitrate includes: ammonium salts such as ammonium nitrate and the like; alkali metal salts such as sodium nitrate, potassium nitrate and the like; and alkali earth metal salts such as barium nitrate, strontium nitrate and the like. Nitride includes: alkali metal salts such as sodium nitride, barium nitride and the like; and alkali earth metal salts such as barium nitride and the like. Oxohalide includes halide and perhalide.

Halide include: alkali metal salts such as potassium chlorate, sodium chlorate and the like; alkali earth metal salts such as barium chlorate, potassium chlorate and the like; and ammonium salts such as ammonium chlorate and the like. Specific examples of perhalide include: alkali metal salts such as potassium perchlorate, sodium perchlorate and the like; alkali earth metal salts such as barium perchlorate, potassium perchlorate and the like; and ammonium salts such as ammonium perchlorate and the like.

An oxidizing agent preferable in terms of the ignitability and combustibility for use in the firing agents 26, 39 is potassium salt, and specifically, potassium nitrate, potassium nitride, potassium chlorate, and potassium perchlorate. An especially preferable oxidizing agent is potassium perchlorate. An oxidizing agent preferable in terms of the combustibility is ammonium salt. Specifically, preferable examples of the oxidizing agent include ammonium nitrate, ammonium chlorate, and ammonium perchlorate. An especially preferable oxidizing agent is ammonium perchlorate. Since ammonium perchlorate generates hydrogen chloride when it is burned, it is preferable to blend a chlorine remover such as sodium nitrate and potassium nitrate to at least one of the firing agents and the non-azide gas generating agents to prevent the release of the hydrogen chloride.

From the viewpoint of reducing the amount of hydrogen chloride generated in the generated gas as well as increasing the amount of the gas to be generated, the blending amount between the perchlorate and the chlorine remover is preferably 1.0 to 1.2 moles of the chlorine remover, more preferably 1.0 to 1.1 moles and especially preferably 1.0 to 1.05 moles of the chlorine remover with respect to 1.0 moles of the perchlorate. If the blending amount of the chlorine remover is less than 1.0 moles, the hydrogen chloride generated from the perchlorate cannot be completely captured and tends to be released into the vehicle compartment. If the blending amount exceeds 1.2 moles, the amount of the gas to be generated tends to decrease.

When the firing agents 26, 39 respectively contain perchlorate such as ammonium perchlorate and the like as an oxidizer but contain no chlorine remover, the non-azide gas generating agents may contain, as an oxidizing agent, a chlorine remover in an amount capable of also capturing the hydrogen chloride generated from the firing agents 26, 39. If at least one of the firing agents or the non-azide gas generating agents contains the aforementioned amount of the chlorine remover, the generation of hydrogen chloride is prevented when the vehicle occupant protection device is operated.

The oxidizing agent is preferably in the form of powder in terms of mixing property and combustibility. A preferable average particle diameter of the powder is 1 to 200 μm. If less than 1 μm, the production tends to be difficult. On the other hand, if the average particle diameter exceeds 200 μm, the production device tends to be clogged, resulting in the decrease in the production efficiency and the reduction in the ignitability and combustion speed of the firing agents. In consideration of the productivity and combustion performance, an average particle diameter of the oxidizing agent is 1 to 100 μm, and an especially preferable average particle diameter is 1 to 50 μm.

The blending amount of the oxidizing agent is preferably 68 to 98 mass %, and more preferably 78 to 96 mass %, and especially preferably 82 to 95 mass %, with respect to the total mass amount of the oxidizing agent and a fuel. If the blending amount of the oxidizing agent is less than 68 mass %, the ignitability of the firing agents 26, 39 is poor and their combustion speed tends to be slow. Such firing agents likely cannot serve as the firing agents. On the other hand, if the blending amount of the oxidizing agent exceeds 98 mass %, the mechanical property of the firing agents 26, 39 tends to be low.

Fuel will now be described. The fuel to be used in the firing agents 26, 39 is not specifically limited, and any known fuel may be employed. Examples of the fuel include a polymer binder, powdered fine crystalline carbon, and a nitrogen-containing compound.

A polymer binder will now be described. The polymer binder has both of a function as a binder for shaping powdered constituent components into granules and a function as fuel.

Examples of the polymer binder include: cellulose polymers such as nitrocellulose, cellulose acetate, carboxymethyl cellulose and their salts, carboxymethylethyl cellulose, hydroxymethyl cellulose, hydroxyethyl cellulose, hydroxypropyl cellulose, fine crystalline cellulose, cellulose acetate butyrate, methyl cellulose, ethyl cellulose, cellulose acetate nitrate, cellulose nitrate carboxymethyl ethyl and the like; polyvinyl polymers such as polyvinyl alcohol, polyvinyl butyral, polyvinyl ether, polyvinyl acetal, polyvinyl formal, polyvinyl pyrrolidone, polyvinyl caprolactam, copolymer of polyvinyl pyrrolidone and polyvinyl caprolactam, carboxyvinyl polymer and the like; polyvinyl polymers such as carboxy vinyl polymer and the like; polyester polymers such as polyester synthetic fibers, polyethylene telephthalate, unsaturated polyester resin and the like; polyurethane polymers such as urethane resin and the like; polyether polymers such as polypropylene oxide, polyphenylene oxide, polyether imide and the like; poly(meth)acrylate derivatives such as polyacrylamide, hydroazide polyacrylate, soda polyacrylate, polyacrylate, polymethacrylate, polymethyl methacrylate and the like; thermoplastic elastomers such as polyurethane elastomer (trade name: Pandex, available from Dainippon and Chemicals Incorporated), polyester elastomer (trade name: Pelprene, available from Toyobo Co., Ltd.), polystyrene elastomer (trade name: Craitone, available from Shell Japan Co., Ltd.) and the like; polyamides such as nylon 6, nylon 66, nylon 610, nylon 612, nylon 11, nylon 12, nylon 46, copolymer polyamide, methoxymethylated polyamide, alcohol-soluble polyamide and the like; energy compound binders such as glycidyl azide polymer, 3,3-bis(azidemethyl)oxetane, 3-azidemethyl-3-methyloxetane, 3-nitratemethyl-3-methyloxetane and the like; polysaccharides such as Cyanoposis Gum, soluble-starch, pectin, chitin, and their derivatives and the like; rubbers such as acryl rubber, isoprene rubber, urethane rubber, silicon rubber, Biton (trade name of Dupont), butadiene rubber, butyl rubber, nitrile-butadiene rubber, nitrile-butadiene rubber, fluorine-contained rubber and the like. At least one of these polymer binders is properly selected and used. Among these polymer binders, preferable are cellulose binders such as cellulose acetate, cellulose acetate butyrate, or ethyl cellulose and the like due to their high ability of shaping powdered constituent components of oxidizing agent and fuel.

Powdered fine crystalline carbon will now be described. Examples of the powdered fine crystalline carbon include activated carbon, charcoal, coke, animal charcoal, bone charcoal, and bituminous coal. The powdered fine crystalline carbon is an aggregation of graphite fine crystals of which structural completeness is insufficient as compared with that of graphite. The two-dimensional structure of the powdered fine crystalline carbon is similar to that of graphite. The powdered fine crystalline carbon has a structure in which net planes are parallel to each other and laminated at equal intervals. The vertical orientation of the net planes (layers) is incomplete. The net planes (layers) are irregularly laminated, or alternatively, hexagonal carbon skeletons irregularly intersect with each other to create space grates linked to each other, or alternatively, are laminated bodies having distortion on the graphite surface. A preferable powdered fine crystalline carbon is activated carbon and vegetable charcoal having high reactivity with the oxidizing agent.

The powdered fine crystalline carbon is preferably powder from the viewpoint of mixing property and combustibility. The average grain diameter thereof is preferably 0.1 to 200 μm. If less than 0.1 μm, the molding of the powdered body tends to be difficult. On the other hand, if the average grain diameter exceeds 200 μm, the production device for the firing agents 26, 39 are clogged, resulting in lowering the production efficiency. In addition, the ignitability and the combustion speed are also lowered.

In consideration of the mechanical property and the combustion performance of the firing agents 26, 39, the average grain diameter thereof is preferably 1 to 100 μm, and especially preferable is 1 to 50 μm. The specific surface area of the powdered fine crystalline carbon is preferably 5 to 1600 m$^2$/g. If the specific surface area of the powdered fine crystalline carbon is less than 5 m$^2$/g, the combustion speed of the firing agents 26, 39 tends to be slow. On the other hand, if the specific surface area of the powdered fine crystalline carbon exceeds 1600 m$^2$/g, the productivity of the powdered fine crystalline carbon tends to be poor. In addition, in consideration of the mechanical property and the combustibility of the firing agents 26, 39, the specific surface area thereof is preferably 10 to 1500 m$^2$/g, and especially preferable is 50 to 1300 m$^2$/g.

A nitrogen-containing compound (nitrogen-containing fuel) will now be described. A nitrogen-containing compound includes nitramine compound, guanidine derivative, tetrazole derivative, bitetrazole derivative, triazole derivative, hydrazine derivative, triazine derivative, amino-acid derivative, and acid amide derivative. Examples of the nitrogen-containing compound include trimethylene trinitroamine (RDX), tetramethylene tetranitroamine (HMX), pentaerythritol tetranitrate (PETN), nitroguanidine (NQ), triaminoguanidine nitrate (TAGN), 5-aminotetrazole, dinitroamerin, azodicarbonamide, and hydrazine nitrate.

An average grain diameter of the nitrogen-containing compound is preferably 1 to 200 μm. If the nitrogen-containing compound having an average grain diameter of less than 1 μm is used, the molding of the firing agents tends to be difficult. On the other hand, if the nitrogen-containing compound having an average grain diameter of larger than 200 μm is used, the production device for the firing agents 26, 39 are easily clogged, resulting in lowering the production efficiency. In addition, the ignitability and the combustion speed of the firing agents are lowered. In consideration of the mechanical property and the combustibility, the average grain diameter thereof is preferably 1 to 100 μm, and especially preferable is 1 to 30 μm.

The blending amount of the fuel is preferably 2 to 32 mass %, and more preferably 4 to 22 mass %, and especially preferably 5 to 18 mass %, with respect to the total mass of the oxidizing agent and the fuel. If the blending amount of the fuel is less than 2 mass %, the mechanical property of the firing agents 26, 39 lowers and the generated gas amount also tends to decrease accordingly. If the blending amount of the fuel exceeds 32 mass %, the ignitability of the firing agents 26, 39 is poor, and the combustion speed tends to be low, thereby lowering the ignitability.

The firing agents 26, 39 may contain a plasticizer in order to enhance the moldability. Any known plasticizers having good compatibility with the binder may be employed. Examples of the plasticizer include: aliphatic ester plasticizer such as acetyl tributyl citrate, acetyl triethyl citrate and the like; diester phthalate plasticizer such as dibutyl phthalate, dimethyl phthalate, diethyl phthalate and the like; nitro plasticizer such as phosphate ester, triacetin, trimethylolethane trinitrate, diethylene glycol dinitrate, triethylene glycol dinitrate, nitroglycerine, bis-2,2-dinitropropylacetal/formal and the like; and glycidylazide plasticizer.

The blending amount of the plasticizer is preferably 15 mass % or lower in the firing agent. If the added amount of the plasticizer exceeds 15 mass %, the proportion of the components other than the plasticizer is lowered, resulting in lowering the combustibility and ignitability. In consideration of the combustibility and ignitability, the preferable blending amount of the plasticizer is 1 to 12 mass %, and especially preferable blending amount thereof is 1 to 8 mass %.

The firing agents 26, 39 may be blended with an aging stabilizer in order to enhance their stability over a long period of time. Any known aging stabilizer capable of enhancing the elapsed stability may be employed. Examples of the aging stabilizer include: diphenyl urea derivatives such as diphenyl urea, methyldiphenyl urea, ethyldiphenyl urea, diethylphenyl urea, dimethyldiphenyl urea, methyl ethyl diphenyl urea and the like; diphenyl amine derivatives such as diphenyl amine, 2-nitrodiphenyl amine and the like; phenyl urethane derivatives such as ethyl phenyl urethane, methyl phenyl urethane and the like; diphenyl urethane derivatives such as diphenyl urethane and the like; and resorcinol. Especially preferable example of the aging stabilizer include diphenyl amine and diethyl diphenyl urea capable of providing excellent elapsed stability and early combustion stage ignitability to the firing agents 26, 39.

The blending amount of the aging stabilizer is preferably 10 mass % or less in the respective firing agents 26, 39. If larger than 10 mass %, although the effect as a stabilizer is enormous, the blending proportion of the other components lowers, and the combustibility and ignitability tend to be poor. In order to enhance the elapsed stability of the firing agents 26, 39 and in consideration of the combustibility and ignitability thereof, the blending amount of 0.2 to 5 mass % is more preferable, and 0.2 to 3 mass % is especially preferable.

The firing agents 26, 39 may be blended with a slag forming agent, in order to suppress the release of the oxides of alkali metal or alkali earth metal generated when the oxidizing agent is decomposed from being released out of the gas generating devices as mists. Examples of the slag-forming agent include silica, alumina, acid clay, talc, mica, molybdenum disulfide. A preferable slag forming agent is silica, alumina, or acid clay.

The blending amount of the slag forming agent is preferably 10 mass % or lower in the respective firing agents 26, 39. If the blending amount of the slag forming agent exceeds 10 mass %, the blending proportion of the other components lowers, and the combustibility and ignitability decrease. In consideration of combustibility and ignitability, the preferable blending amount of the slag forming agent is 1 to 5 mass %, and especially preferable blending amount is 1 to 3 mass %.

A preferable composition of the firing agent is a combination of alkali metal salt of oxohalogen acid as an oxidizing agent, a cellulose polymer binder as fuel, and aliphatic ester as a plasticizer. More specifically, a combination of potassium perchlorate as an oxidizing agent, cellulose acetate butyrate as fuel, and acetyl tributyl citrate as a plasticizer is preferable. This composition is excellent in ignitability, combustibility, heat resistance, and mechanical property.

The following variations of the firing agent composition are also preferable:

A combination of ammonium salt of oxohalogen acid as an oxidizing agent, a cellulose polymer binder as fuel, and aliphatic ester as a plasticizer. More specifically, a combination of ammonium perchlorate as an oxidizing agent, cellulose acetate butyrate as fuel, acetyltributyl citrate as a plasticizer. This composition is excellent in combustibility, heat resistance, and mechanical property.

Since the firing agents 26, 39 are required to have excellent ignitability and combustibility, it is preferable that the firing agents 26, 39 has a composition containing excessive amount of oxygen (an oxygen balance is positive).

A composition of the non-azide gas generating agent will now be described.

The non-azide gas generating agent is composed of, in addition to the oxidizing agent and fuel, a plasticizer, an aging stabilizer, a slag forming agent and the like. The oxidizing agent is not specifically limited, and any oxidizing agent used for the firing agents 26, 39 may be employed. In consideration of the gasification rate, ammonium salt, and specifically, ammonium nitrate, ammonium chlorate, ammonium perchlorate are preferable, and ammonium nitrate is especially preferable. The oxidizing agent is preferably in the form of powder in consideration of mixing property and combustibility. An average grain diameter of the powder preferably falls within 1 to 500 μm. If the average grain diameter is less than 1 μm, the production of the non-azide gas generating agent tends to be difficult. On the other hand, if the average grain diameter exceeds 500 μm, the molded product tends to have poor mechanical property, and the combustion speed tends to be low. Further, in consideration of the mechanical property and the combustion performance of the non-azide gas generating agent, more preferable average grain diameter thereof is 1 to 200 μm, and especially preferable is 1 to 100 μm.

The blending amount of the oxidizing agent is preferably 58 to 97 mass %, more preferably 75 to 95 mass %, and especially preferably 78 to 93 mass %, with respect to the total mass of the oxidizing agent and the fuel. If the blending amount of the oxidizing agent is less than 58 mass %, a large amount of carbon monoxide tends to appear in the generated gas. Further, if the blending amount of the oxidizing agent exceeds 97 mass %, the mechanical property of the non-azide gas generating agent lowers, and the combustion speed thereof tends to be low. If the oxygen amount in the non-azide gas generating agent is insufficient (if the oxygen balance is negative), the combustion becomes imperfect when the agent is burned, and harmful carbon monoxide appears.

On the other hand, if the oxygen amount in the non-azide gas generating agent is excessive (if the oxygen balance is positive), a harmful substance such as nitrogen dioxide appears when the agent is burned. For this reason, in order to suppress the generation of harmful substances, it is desirable that the blending ratio between the oxidizing agent and the fuel in the non-azide gas generating agent is adjusted in such a manner that the oxygen amount in the non-azide gas generating agent is neither excessive nor short (the oxygen balance is +/−0). The blending amount of the oxidizing agent in the non-azide gas generating agent is substantially set from this viewpoint.

Fuel will now be described. The fuel contained in the non-azide gas generating agent is not specifically limited. The fuel to be used for the firing agent may be employed. Examples of the fuel include a polymer binder, powdered fine crystalline carbon, and nitrogen-containing compound. Among the polymer binder, preferable is a cellulose binder such as cellulose acetate, cellulose acetate butyrate or ethyl cellulose and the like, due to their high ability of shaping powdered constituent components of oxidizing agent and fuel.

Among the powdered fine crystalline carbon, preferable are activated carbon and vegetable charcoal having high reactivity with the oxidizing agent. The powdered fine crystalline carbon is preferably in the form of powder in consideration of the mixing property and combustibility. The average grain diameter thereof is preferably 0.1 to 500 μm. If less than 0.1 μm, it tends to be difficult to shape the non-azide gas generating agent into the form of grains. On the other hand, if the average grain diameter exceeds 500 μm, the combustion speed tends to be low. Further, in consideration of the mechanical property and the combustion performance of the non-azide gas generating agent, the average grain diameter thereof is preferably 1 to 200 μm, and especially preferably 1 to 100 μm.

The specific surface area of the powdered fine crystalline carbon is preferably 5 to 1600 $m^2/g$. If the specific surface area of the powdered fine crystalline carbon is less than 5 $m^2/g$, the combustion speed of the non-azide gas generating agent tends to be low. On the other hand, if the specific surface area of the powdered fine crystalline carbon exceeds 1600 $m^2/g$, the productivity of the powdered fine crystalline carbon tends to be poor. Further, in consideration of the mechanical property and combustion performance of the non-azide gas generating agent, the specific surface area thereof is preferably 10 to 1500 $m^2/g$, and especially preferably 50 to 1300 $m^2/g$.

Among the nitrogen-containing compounds, preferable are trimethylene trinitroamine (RDX), tetramethylene tetranitroamine (HMX), pentaerythritol tetranitrate (PETN), nitroguanidine (NQ), triaminoguanidine nitrate (TAGN), 5-aminotetrazole, dinitroamerin, azodicarbonamide, hydrazine nitrate and the like.

The average grain diameter of the nitrogen-containing compound is preferably 1 to 500 μm. If the average grain diameter is less than 1 μm, it tends to be difficult to mold the non-azide gas generating agent into grains. If the average grain diameter exceeds 500 μm, the effect of accelerating the combustion speed tends to disappear. Further, in consideration of the mechanical property and the combustion performance of the non-azide gas generating agent, the average grain diameter thereof is preferably 1 to 200 μm, and especially preferably 1 to 100 μm.

The blending amount of the fuel is preferably 3 to 42 mass %, more preferably 5 to 25 mass %, and especially preferably 7 to 22 mass %, with respect to the total mass of the oxidizing agent and the fuel. If the blending amount of the fuel is less than 3 mass %, the mechanical property of the non-azide gas generating agent lowers, and the gas generating amount tends to be low. If the blending amount of the fuel exceeds 42 mass %, a large amount of carbon monoxide tends to appears in the generated gas.

Further, the non-azide gas generating agent may be blended with a plasticizer, in order to provide plasticity and enhanced moldability. Any known plasticizer having good compatibility with the binder may be employed. An adding amount of the plasticizer is preferably 15 mass % or lower in the non-azide gas generating agent.

Further the non-azide gas generating agent may be blended with an aging stabilizer, in order to enhance elapsed stability. The aging stabilizer is not limited to a specific kind. Any known substance capable of enhancing the elapsed stability may be employed. The adding amount of the aging stabilizer is preferably 10 mass % in the non-azide gas generating agent.

The non-azide gas generating agent may be blended with a slag forming agent, in order to suppress the release of the oxides of alkali metal or alkali earth metal generated when the oxidizing agent is decomposed from being released out of the gas generating devices as mists. Any substances may be employed as the slag forming agent, as far as it is capable of forming slag as is the case of the firing agents 26, 39. The adding amount of the slag forming agent is preferably 10 mass % or lower in the non-azide gas generating agent.

A preferable composition as the non-azide gas generating agent is combination of ammonium nitrate salt as an oxidizing agent, a cellulose polymer binder as fuel, and aliphatic ester as a plasticizer. Specifically, a combination of ammonium nitrate as an oxidizing agent, cellulose acetate butyrate as fuel, and acetyltributyl citrate as a plasticizer. This composition is excellent in gasification rate, and is also excellent in heat resistance and mechanical property, and therefore, is preferable as the non-azide gas generating agent.

Alternatively, a combination is ammonium salt of oxyhalogen acid and alkali metal salt of nitric acid as an oxidizing agent, a cellulose polymer binder as fuel, and aliphatic ester as a plasticizer is also preferable. Specifically, a combination of ammonium perchlorate and sodium nitrate as an oxidizing agent, cellulose acetate butyrate as fuel, and acetyl tributyl citrate as a plasticizer. This composition is more preferable as the non-azide gas generating agent due to its excellent gasification rate as well as excellent thermal resistance and mechanical property.

The ratio between the firing agents 26, 39 and the non-azide gas generating agents in the second embodiment is the same as described in the first embodiment.

When the firing agents 26, 39 and the non-azide gas generating agents are used together, it is required without fail that the combustion speed of the firing agents 26, 39 is always higher than the combustion speed of the non-azide gas generating agents. This is because, even if the firing agents 26, 39 having combustion speed lower than that of the non-azide gas generating agents are used, the ignitability and combustibility of the non-azide gas generating agents cannot be improved. When the firing agents 26, 39 and the non-azide gas generating agents made of the same raw materials are used together, it is required that the combustion speed of the firing agents 26, 39 is adjusted to be higher than the combustion speed of the non-azide gas generating agents, by giving them different grain diameters from each other or adjusting the blending proportion between the oxidizing agent and the fuel.

The firing agents 26, 39 of the second embodiment can be produced by the same method as described in the first embodiment. The shape of the firing agents is not specifically limited. The firing agents 26, 39 of the second embodiment may assume the same shape as described in the first embodiment. Examples of the shape of the firing agents include a circular column having an outer diameter of 0.1 to 5 mm and a length of 0.1 to 5 mm, and a circular cylinder having an outer diameter of 0.3 to 5 mm, an inner hole diameter of 0.1 to 4.9 mm, a length of 0.1 to 5 mm, and a wall thickness of about 0.1 to 3 mm.

According to the second embodiment, the following advantages can be obtained.

The firing agents 26, 39 for use in the gas generators of the second embodiment are structured in such a manner that the combustion speed of the firing agents 26, 39 is adjusted to be higher than the combustion speed of the non-azide gas generating agents 25, 38. Due to this structure, the firing agents 26, 39 are ignited earlier than the gas generating agents 25, 38 and their combustion propagates quickly when burned, thereby quickly progressing the combustion of the gas generating agents 25, 38. As a result, the ignitability and combustibility of the non-azide gas generating agents 25, 38 can be enhanced while maintaining high gasification rate.

The aforementioned combustion speed is defined by the reaching time from the point when the energization to the igniter to the point when the maximum pressure is reached by the gas generated in the combustion chambers 24, 32. Then, the firing agents 26, 39 are structured in such a manner that their reaching time is shorter than the reaching time of the non-azide gas generating agents. Therefore, the ignitability and combustibility of the non-azide gas generating agents 25, 38 can be further enhanced.

Hereinafter, the first and second embodiments will be specifically described by way of examples, production examples, and comparative examples.

EXAMPLE 1

To the mixture prepared at a mixing proportion where potassium perchlorate having an average grain diameter of 30 μm was 79.5 mass %, cellulose acetate butyrate was 11.5 mass %, acetyl tributyl citrate was 8.0 mass %, and activated carbon was 1.0 mass %, a mixed solution of 20 mass % of acetone and 10 mass % of ethyl alcohol was added, and the resultant was uniformly mixed in a so-called Werner mixer. The Werner mixer is a device for stirring and mixing by use of a stirring blade extending laterally and supported by a rotating shaft.

The resultant mixture was charged into an extruder. To the extruder, a die having a hole diameter of 0.75 mm and a pin having a diameter of 0.25 mm were attached beforehand. Under the application of pressure, the mixture was extruded through the hole of the die to be molded into a cylinder having one through hole. Thus-obtained molded product was cut into 2.0 mm and then dried to obtain granular firing agents having the shape shown in FIG. 1B. The dimension of the firing agent is shown in Table 1. A closed bomb combustion test was conducted to examine the reaching time required from the point when the energization to the igniter was started to the point to the point when the maximum pressure was reached. The test result is shown in Table 1.

EXAMPLES 2 TO 5

The composition having the same raw material components and blending amounts as of Example 1 was used. By use of the same molding tool as shown in Table 1, an individual firing agent was produced by the same method as of Example 1 and its reaching time was evaluated respectively by the same method as of Example 1. The results are shown in Table 1.

EXAMPLE 6

To the mixture prepared at a mixing proportion where potassium perchlorate having an average grain diameter of 30 μm was 84.2 mass %, cellulose acetate butyrate was 2.0 mass %, acetyl tributyl citrate was 2.0 mass %, and activated carbon was 11.8 mass %, a mixed solution of 30 mass % of acetone and 5 mass % of water was added, and the resultant was uniformly mixed by a Werner mixer.

The resultant mixture was charged into a granulator. To the extruder, a punching metal having an outer diameter of 0.28 mm was attached beforehand. Under the application of pressure, the mixture was extruded through the hole of the punching metal into granular firing agents. The dimension of the firing agent is shown in Table 1. A closed bomb combustion test was conducted to examine the reaching time required from the point when the energization to the igniter was started to the point to the point when the maximum pressure was reached. As shown in Table 1, the reaching time was in the range from 5 to 20 milliseconds.

EXAMPLES 7 TO 8

The composition having the same raw material components and blending amounts as of Example 6 was used. Then, by use of the same molding tool as shown in Table 1, an individual firing agent was produced by the same method as of Example 6 and its reaching time was evaluated respectively by the same method as of Example 6. The results are shown in Table 1.

TABLE 1

| exp. | size of molding tool (mm) | | firing agent | | | | |
| --- | --- | --- | --- | --- | --- | --- | --- |
| | die/ panching metal | pin | shape | diameter (mm) | length (mm) | hole diameter (mm) | minimum dimension (mm) | reaching time (ms) |
| 1 | 0.75 | 0.25 | cylindrical | 0.58 | 1.72 | 0.22 | 0.18 | 7 |
| 2 | 1.00 | 0.25 | cylindrical | 0.78 | 1.82 | 0.24 | 0.27 | 9 |
| 3 | 1.30 | 0.25 | cylindrical | 1.07 | 1.70 | 0.21 | 0.43 | 13 |
| 4 | 0.26 | — | columnar | 0.21 | 1.58 | — | 0.21 | 8 |
| 5 | 0.50 | — | columnar | 0.38 | 1.72 | — | 0.38 | 12 |
| 6 | 0.28 | — | columnar | 0.20 | 0.44 | — | 0.20 | 6 |
| 7 | 0.45 | — | columnar | 0.31 | 0.62 | — | 0.31 | 9 |
| 8 | 0.70 | — | columnar | 0.50 | 0.91 | — | 0.50 | 13 |

Production Example 1 of Gas Generating Agent for Use in Seat Belt Pretensioner

A mixture of 90.0 mass % of ammonium nitrate having an average grain diameter of 80 μm, 6.0 mass % of cellulose acetate butyrate, 3.0 mass % of acetyl tributyl citrate, and 1.0 mass % of activated carbon was prepared. A mixed solution of 20 mass % of acetone and 10 mass % of ethyl alcohol was prepared. The mixed solution was added to the mixture, and the resultant was uniformly mixed in a Werner mixer to produce a kneaded body.

The kneaded body was charged into an extruder. To the extruder, a die having a hole diameter of 1.75 mm and one pin having a diameter of 0.25 mm were attached beforehand. Under the application of pressure, the kneaded body was passed through the die so as to be extruded and molded into a cylinder having one through hole. Thus-obtained cylinder was cut into 2.0 mm and then dried to obtain granular gas generating agent for use in pretensioner having the shape shown in FIG. 1B. The dimension of the gas generating agent is shown in Table 2.

Production Example 2 of Gas Generating Agent for Use in Seat Belt Pretensioner

A mixture was prepared at a mixing proportion where ammonium perchlorate having an average grain diameter of 80 μm was 47.1 mass %, sodium nitrate having an average grain diameter of 70 μm was 34.9 mass %, cellulose acetate butyrate was 9.0 mass %, acetyl tributyl citrate was 8.0 mass %, and activated carbon was 1.0 mass %. Then, by use of the molding tools shown in Table 2, a gas generating agent was produced by the same method as of Production Example 1 for the gas generating agent for use in seat belt pretensioner. The dimension of the gas generating agent is shown in Table 2.

TABLE 2

| production exp. | gas generating agent | | | | | | |
| --- | --- | --- | --- | --- | --- | --- | --- |
| | size of molding tool | | shape | diameter (mm) | length (mm) | hole diameter (mm) | minimum dimension (mm) |
| | die | pin | | | | | |
| 1 | 1.75 | 0.25 | cylindrical | 1.4 | 1.8 | 0.2 | 0.61 |
| 2 | 1.95 | 0.25 | cylindrical | 1.6 | 1.8 | 0.2 | 0.70 |

EXAMPLE 9

A combustion test was conducted in a state where 91 mass % of the gas generating agent prepared in Production Example 1 for gas generating agent for use in seat belt pretensioiner, and 9 mass % of the firing agent prepared in Example 1 were disposed in a closed bomb device. The gasification rate of this composition was obtained in a theoretical calculation (the mass ratio of the gaseous components in the combustion product of the composition was expressed by %). In the closed bomb combustion test, it was examined whether or not the reaching time of the firing agent from the start of energization to the maximum pressure was in the range of 15 to 30 milliseconds which was required for the gas generating agent for use in seat belt pretensioner. The rest result is shown in Table 3.

EXAMPLES 10 TO 20

Figure 7:
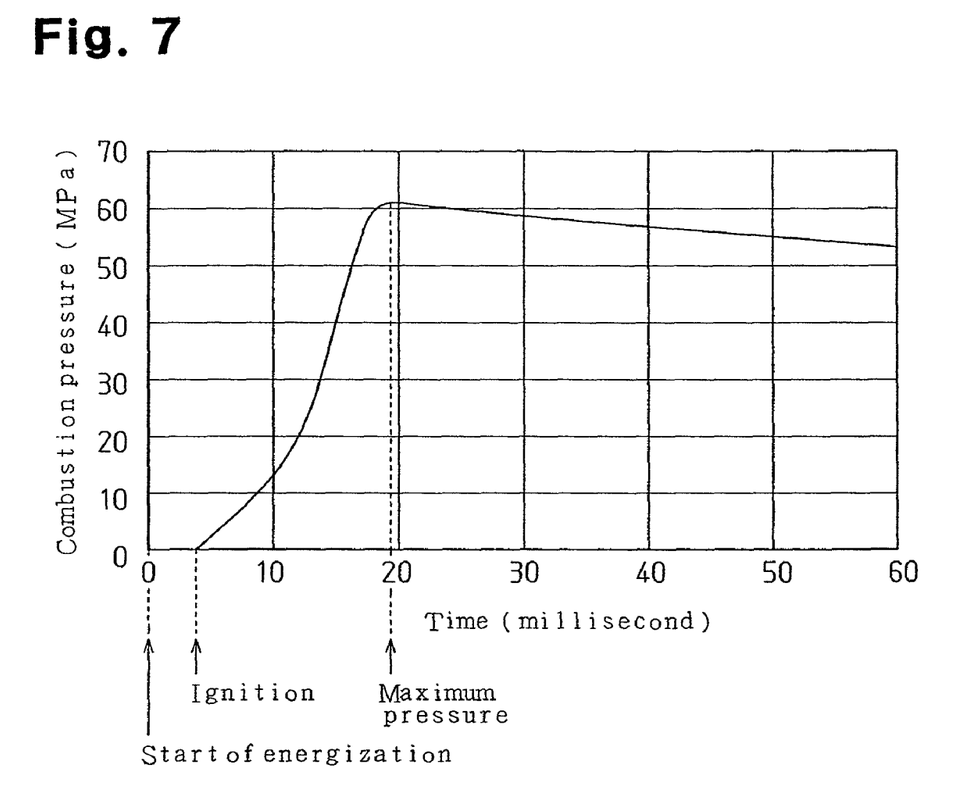
FIG. 7 is a combustion profile of Example 15.

An individual composition was prepared by mixing at a mass ratio shown in Table 3, and the feature of each composition was evaluated by the same method as of Example 9. The evaluation is shown in Table 3. FIG. 7 is a combustion profile exhibited in Example 15.

TABLE 3

| exp. | gas generating agent (Table 2) | firing agent (Table 1) | mass ratio (gas generating agent/ firing agent) | gasification rate (%) | reaching time (ms) |
| --- | --- | --- | --- | --- | --- |
| 9 | 1 | 1 | 91/9 | 96 | 21 |
| 10 | 1 | 2 | 91/9 | 96 | 23 |
| 11 | 1 | 3 | 91/9 | 96 | 29 |
| 12 | 1 | 4 | 91/9 | 96 | 22 |
| 13 | 1 | 7 | 91/9 | 96 | 20 |
| 14 | 2 | 1 | 91/9 | 75 | 17 |
| 15 | 2 | 2 | 91/9 | 75 | 20 |
| 16 | 2 | 3 | 91/9 | 75 | 24 |
| 17 | 2 | 4 | 91/9 | 75 | 17 |
| 18 | 2 | 7 | 91/9 | 75 | 15 |
| 19 | 2 | 1 | 97/3 | 76 | 28 |
| 20 | 2 | 3 | 75/25 | 72 | 15 |
| Comp. Exp 1 | 1 | — | 100/0 | 100 | 46 |
| Comp. Exp 2 | 2 | — | 100/0 | 76 | 40 |

EXAMPLE 21

To a mixture of 8.8 mass % of potassium perchlorate having an average grain diameter of 30 μm and 21.2 mass % of cellulose acetate butyrate, a mixed solution obtained by mixing 20 mass % of acetone and 10 mass % of ethyl alcohol was added, and the resultant was uniformly mixed by a so-called Werner mixer. The Werner mixer is a device for stirring and mixing by use of a stirring blade extending laterally and supported by a rotating shaft.

The resultant mixture was charged into an extruder. To the extruder, a die having a hole diameter of 0.95 mm and a pin having a diameter of 0.25 mm were attached beforehand. Under the application of pressure, the mixture was extruded through the hole of the die to be molded into a cylinder having one through hole. Thus-obtained molded product was cut into 2.0 mm and then dried to obtain granular firing agents having the shape shown in FIG. 1B. The dimension of the firing agent is shown in Table 4. A closed bomb combustion test was conducted to examine the reaching time required from the point when the energization to the igniter was started to the point when the maximum pressure was reached. As shown in Table 4, the reaching time was in the range of 5 to 20 milliseconds.

EXAMPLES 22 TO 27

An individual firing agent was produced at a composition shown in Table 4 by the same method as of Example 21, and its feature was evaluated by the same method as of Example 21. The result is shown in Table 4.

EXAMPLE 28

To a mixture of 85.2 mass % of potassium perchlorate having an average grain diameter of 30 μm, 3.0 mass % of cellulose acetate butyrate, 2.0 mass % of acetyl tributyl citrate, and 9.8 mass % of activated carbon, a mixed solution obtained by mixing 30 mass % of acetone and 5 mass % of water was added, and the resultant was uniformly mixed by a Werner mixer.

The resultant mixture was charged into a granulator. To the extruder, a punching metal having an outer diameter of 0.35 mm was attached beforehand. Under the application of pressure, the mixture was extruded through the hole of the punching metal into granular firing agents having the shape shown in FIG. 1A. The dimension of the firing agent is shown in Table 4. A closed bomb combustion test was conducted to examine the reaching time required from the point when the energization to the igniter was started to the point when the maximum pressure was reached. As shown in Table 4, the reaching time was in the range from 5 to 20 milliseconds.

EXAMPLE 29

A firing agent was produced at the composition shown in Table 4 by the same method as of Example 28, and its feature was evaluated by the same method as of Example 28. The result is shown in Table 4.

TABLE 4

| | | | firing agent | | | | |
|---|---|---|---|---|---|---|---|
| exp. | ingredients | mass % | shape | diameter (mm) | length (mm) | hole diameter (mm) | minimum dimension (mm) |
| 21 | potassium perchlorate<br>cellulose acetate butyrate | 78.8<br>21.2 | cylindrical | 0.8 | 1.8 | 0.2 | 11 |
| 22 | ammonium perchlorate<br>sodium nitrate<br>cellulose acetate butyrate | 47.5<br>34.1<br>18.4 | cylindrical | 0.7 | 1.7 | 0.2 | 14 |
| 23 | potassium perchlorate<br>cellulose acetate butyrate<br>acetyl tributyl citrate | 79.9<br>13.6<br>6.5 | cylindrical | 0.8 | 1.6 | 0.2 | 12 |
| 24 | ammonium perchlorate<br>sodium nitrate<br>cellulose acetate butyrate<br>acetyl tributyl citrate | 47.4<br>34.6<br>12.0<br>6.0 | cylindrical | 0.7 | 1.8 | 0.2 | 14 |
| 25 | potassium perchlorate<br>cellulose acetate butyrate<br>acetyl tributyl citrate<br>activated carbon | 80.5<br>11.5<br>7.0<br>1.0 | cylindrical | 0.8 | 1.8 | 0.2 | 9 |
| 26 | ammonium perchlorate<br>sodium nitrate<br>cellulose acetate butyrate<br>acetyl tributyl citrate<br>activated carbon | 48.2<br>35.8<br>8.0<br>6.0<br>2.0 | cylindrical | 0.7 | 1.6 | 0.2 | 11 |
| 27 | ammonium perchlorate<br>cellulose acetate butyrate<br>acetyl tributyl citrate<br>activated carbon | 85.5<br>9.0<br>4.5<br>1.0 | cylindrical | 0.7 | 1.8 | 0.2 | 10 |
| 28 | potassium perchlorate<br>cellulose acetate butyrate<br>acetyl tributyl citrate<br>activated carbon | 85.2<br>3.0<br>2.0<br>9.8 | columnar | 0.3 | 0.5 | — | 8 |
| 29 | ammonium perchlorate<br>sodium nitrate<br>cellulose acetate butyrate<br>acetyl tributyl citrate<br>activated carbon | 50.2<br>36.3<br>3.0<br>2.0<br>8.5 | columnar | 0.3 | 0.5 | — | 10 |

Production Examples 3, 4 for Gas Generating Agent for Use in Pretensioner

Gas generating agents having the dimensions and compositions shown in Table 5 were produced by the same method as of Production Examples 1, 2.

TABLE 5

| production exp. | ingredients | mass % | shape | gas generating agent diameter (mm) | length (mm) | hole diameter (mm) |
|---|---|---|---|---|---|---|
| 3 | ammonium nitrate | 90.0 | cylindrical | 1.4 | 1.8 | 0.2 |
|  | cellulose acetate butyrate | 6.0 |  |  |  |  |
|  | acetyl tributyl citrate | 3.0 |  |  |  |  |
|  | activated carbon | 1.0 |  |  |  |  |
| 4 | ammonium perchlorate | 47.1 | cylindrical | 1.6 | 1.8 | 0.2 |
|  | sodium nitrate | 34.9 |  |  |  |  |
|  | cellulose acetate butyrate | 9.0 |  |  |  |  |
|  | acetyl tributyl citrate | 8.0 |  |  |  |  |
|  | activated carbon | 1.0 |  |  |  |  |

EXAMPLE 30

Mixing was conducted in such a manner that the gas generating agent obtained in Production Example 3 was 91 mass % and the firing agent obtained in Example 21 was 9 mass %, and the mixture was burned in a closed bomb combustion device. The gasification rate of this composition was obtained in a theoretical calculation (the mass ratio of the gaseous components in the combustion product of the composition was expressed in %). In addition, the reaching time from the start of energization to the maximum pressure was examined. As shown in Table 6, the reaching time was in the range of 15 to 30 milliseconds which was required for the gas generating agent for use in seat belt pretensioner.

TABLE 6

| exp. | gas generating agent (Table 5) | firing agent (Table 4) | mass ratio (gas generating agent/ firing agent) | gasification rate (%) | reaching time (ms) |
|---|---|---|---|---|---|
| 30 | 3 | 21 | 91/9 | 96 | 26 |
| 31 | 3 | 22 | 91/9 | 98 | 28 |
| 32 | 3 | 25 | 91/9 | 69 | 24 |
| 33 | 3 | 26 | 91/9 | 98 | 25 |
| 34 | 3 | 28 | 91/9 | 96 | 24 |
| 35 | 4 | 21 | 91/9 | 75 | 21 |
| 36 | 4 | 22 | 91/9 | 77 | 23 |
| 37 | 4 | 25 | 91/9 | 75 | 20 |
| 38 | 4 | 26 | 91/9 | 76 | 22 |
| 39 | 4 | 28 | 91/9 | 75 | 18 |
| 40 | 4 | 26 | 97/3 | 76 | 29 |
| 41 | 4 | 25 | 75/25 | 72 | 16 |

EXAMPLES 31 TO 41

The gas generating agent and the firing agent were mixed with each other at a mass ratio shown in Table 6. The feature of the individual case was evaluated by the same method as of Example 30. The results are shown in Table 6. In Example 37, substantially the same combustion profile as the combustion profile shown in FIG. 7 was shown.

Comparative Examples 1 to 2

Figure 6:
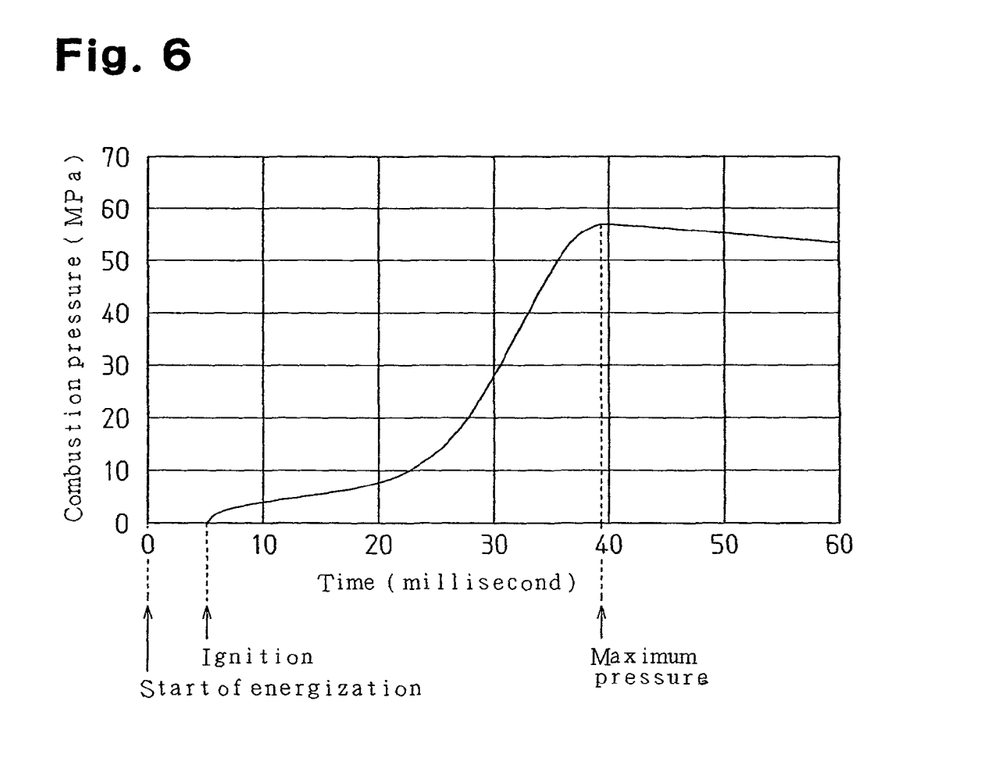
FIG. 6 is a combustion profile of Comparative Example 2.

The feature obtained from using the gas generating agent for use in seat belt pretensioner alone without using a firing agent was evaluated by the same method as of Example 10. The result is shown in Table 3. FIG. 6 shows a combustion profile exhibited in Comparative Example 2.

The following findings were obtained from the rest results shown in Tables 1 to 6 and FIGS. 6 and 7.

The reaching times from the start of energization to the maximum pressure of the firing agents obtained in Examples 1 to 8 were successfully adjusted to be 6 to 13 milliseconds. In Examples 9 to 20 in which the granular firing agents were blended, the ignitability and the combustibility were improved. Thus, the reaching time falling within the range of 15 to 30 milliseconds was achieved in all of these examples. This revealed that all of these agents were usable as the gas generating agents for use in seat belt pretensioner.

The reaching times from the start of energization to the maximum pressure of the firing agents shown in Examples 21 to 29 were successfully adjusted to be 8 to 14 milliseconds. In examples 30 to 41 in which the firing agents were blended, the ignitability and the combustibility were improved. Thus, the reaching time falling within the range of 15 to 30 milliseconds was achieved in all of these examples. This revealed that all of these agents were usable as the gas generating agents for use in seat belt pretensioner. In Example 41, the firing agent was blended at high blending proportion. It has been found that, although the resultant agent was useable as the gas generating agents for use in pretensioner, the gasification rate tended to be low.

Contrary to the above, the gas generating agents of Comparative Examples 1 and 2 blended with no firing agent, the reaching time was 30 milliseconds or more due to their low ignitability and low combustibility. The agents were not useable as the gas generating agents for use in pretensioner.

The combustion profile shown in FIG. 6 is a shape of a so-called S-curve. In other words, when the gas generating agent of Comparative Example 2 was used alone, the combustion speed (combustion pressure) at the initial stage of combustion (for about 23 milliseconds from the start of energization to the igniter) was very low, and the combustion pressure started to rise in the middle stage of combustion (after the elapse of about 23 milliseconds). Thus, there was a problem in combustion.

On the other hand, the combustion profile shown in FIG. 7 is a shape of a so-called straight line. In other words, when the gas generating agents of Example 15 and Example 37 blended with the gas generating agents for use in seat belt pretensioner were used, the combustion pressure (combustion speed) to rise in a linear fashion and reach high combustion speed at the initial stage of combustion. Thus, the combustibility was significantly improved.

A sample was prepared using the composition of the gas generating agent for use in seat belt pretensioner shown in Comparative Example 2 and having a reduced minimum dimension L. A closed bomb test was conducted for the sample. As a result, it was found that, as smaller the minimum dimension L was, the ignitability was improved and the reaching time was accelerated. However, it was found that, since the combustion profile remained in the shape of S-curve, the improvement in the combustibility was impossible. From the above results, it was found that the firing agent always must be used together, in order to improve the ignitability and the combustibility.

A test was conducted to examine the heat resistance and the carbon monoxide concentration after combustion for Example 15. As a result, it was revealed, that no problem was found in both of these properties. The agent of Example 19 was found that, due to the small mass ratio of the firing agent, although it was useable as the gas generating agent for use in seat belt pretensioner, the reaching time tended to be long. The agent of Example 20 was found that, due to the large mass ratio of the firing agent, although it was useable as the gas generating agent for use in seat belt pretensioner, the gasification rate tended to be low.

Each of the embodiments may be modified as follows.

The firing agent 39 may be accommodated into a site of the igniting charge 35 in the gas generating device 30. Alternatively, the firing agent 39 may be disposed instead of the igniting charge 35.

The content of the firing agents 26, 39 with respect to the non-azide gas generating agents 25, 38 may be set to be higher for the gas generating device 12 than for the gas generating device 30. In this case, the non-azide gas generating agent 25 accommodated in the combustion chamber 24 of the gas generating device 12 can be sufficiently burned.

The non-azide gas generating agents may contain a combustion catalyst such as copper oxide, iron oxide, and manganese oxide, or an environment-resistant stabilizer such as oxyethylenedodecylamine, polyoxyethylenedodecylamine, and polyoxyethylene octadecylamine and the like.

In the gas generating device 12, thin-thickness portions or through holes may be formed instead of the grooves 27.

The firing agents 26, 39 may be used in a rear seat gas generating device, a side impact gas generating device, a curtain gas generating device and the like.

The most preferable firing agent has the shape and dimension described in the first embodiment and the composition described in the second embodiment.

The invention claimed is:

1. A gas generating device of a vehicle occupant protection device, comprising:
   a combustion chamber;
   an igniting device configured to supply thermal energy to the combustion chamber;
   a non-azide gas generating agent accommodated in the combustion chamber; and
   a firing agent accommodated and dispersed in the combustion chamber in a state of being mixed with the non-azide gas generating agent to promote firing of the non-azide gas generating agent, wherein the firing agent contains an oxidizing agent and a fuel with the weight ratio between the oxidizing agent and the fuel being 68:32 to 98:2,
   wherein the non-azide gas generating agent burns at a first combustion speed, and wherein the firing agent is configured such that the firing agent burns at a second combustion speed higher than the first combustion speed of the non-azide gas generating agent.

2. The gas generating device according to claim 1,
   wherein the non-azide gas generating agent has a shape defined by first plural dimensions including first minimum dimensions;
   wherein the firing agent has a shape defined by second plural dimensions including second minimum dimensions that are smaller than the first minimum dimensions of the non-azide gas generating agent.

3. The gas generating device according to claim 2,
   wherein the non-azide gas generating agent and the firing agent are molded grains.

* * * * *